(12) United States Patent
Gurbani et al.

(10) Patent No.: US 6,282,275 B1
(45) Date of Patent: *Aug. 28, 2001

(54) TELEPHONE CALLER IDENTIFICATION LOG WITH INTERNET ACCESS

(75) Inventors: Vijay Kumar Gurbani, Lisle; Ajay Jain, Aurora, both of IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,995

(22) Filed: Aug. 7, 1998

(51) Int. Cl.$^7$ .................................................. H04M 15/06
(52) U.S. Cl. .................. 379/142; 379/88.21; 379/93.23; 379/127
(58) Field of Search .............................. 379/88.19–88.21, 379/93.24, 93.23, 120–121, 127, 142, 354

(56) References Cited

U.S. PATENT DOCUMENTS

| 5,289,530 | * | 2/1994 | Reese ....................................... 379/88 |
| 5,724,412 | * | 3/1998 | Srinivasan ........................... 379/93.23 |
| 5,881,023 | * | 3/1999 | Gu et al. ................................ 368/10 |
| 5,896,444 | * | 4/1999 | Perlman et al. .................... 379/93.35 |
| 6,097,793 | * | 8/2000 | Jandel .............................. 379/93.23 |

* cited by examiner

Primary Examiner—Duc Nguyen
(74) Attorney, Agent, or Firm—J. R. Penrod

(57) ABSTRACT

A method for storing caller identification information as a log of answered and unanswered telephone calls at a central server. This call log server is accessible by the internet, so if a subscriber is traveling, he or she is still able to access and read a list of answered and unanswered calls to the subscriber's home station. Internet devices such as browsers that are internet telephony capable may return a call from the call log list using a point and click sequence. The call log may be processed from natural chronological order into a personal priority order such as: family, professional and everything else. This call log may also be forwarded via e-mail to the subscriber. Such e-mail forwarding may be either contemporaneously with call logging or periodically.

31 Claims, 5 Drawing Sheets

CALLS OF 630 YYY-XXXX
John Jones

| CALLER NAME | CALLER NO. | TIME |
|---|---|---|
| Mrs. T. Jones | 312 555-1211 | 09:30 am |
| (none) | (none) | 09:20 am |
| Dr. Smith | 630 555-9999 | 09:50 am |
| . | . | . |
| . | . | . |
| . | . | . |

*FIG. 2A*

CALLS OF 630 YYY-XXXX
John Jones

| CALLER NAME | CALLER NO. | TIME |
|---|---|---|
| Mrs. T. Jones | 312 555-1211 | 09:30 am |
| Dr. Smith | 630 555-9999 | 09:50 am |
| (none) | (none) | 09:20 am |
| . . . | . . . | . . . |

FIG. 2B

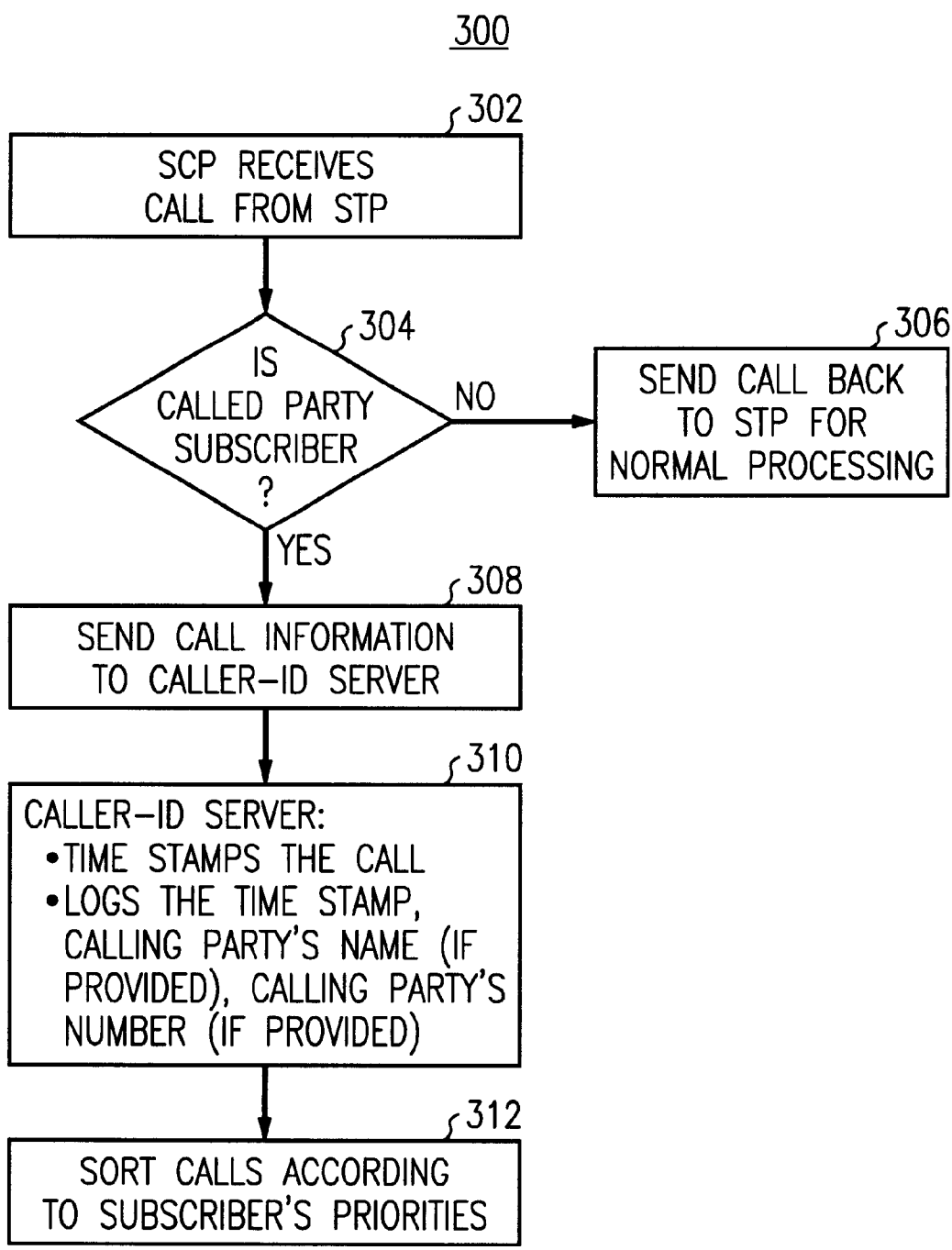

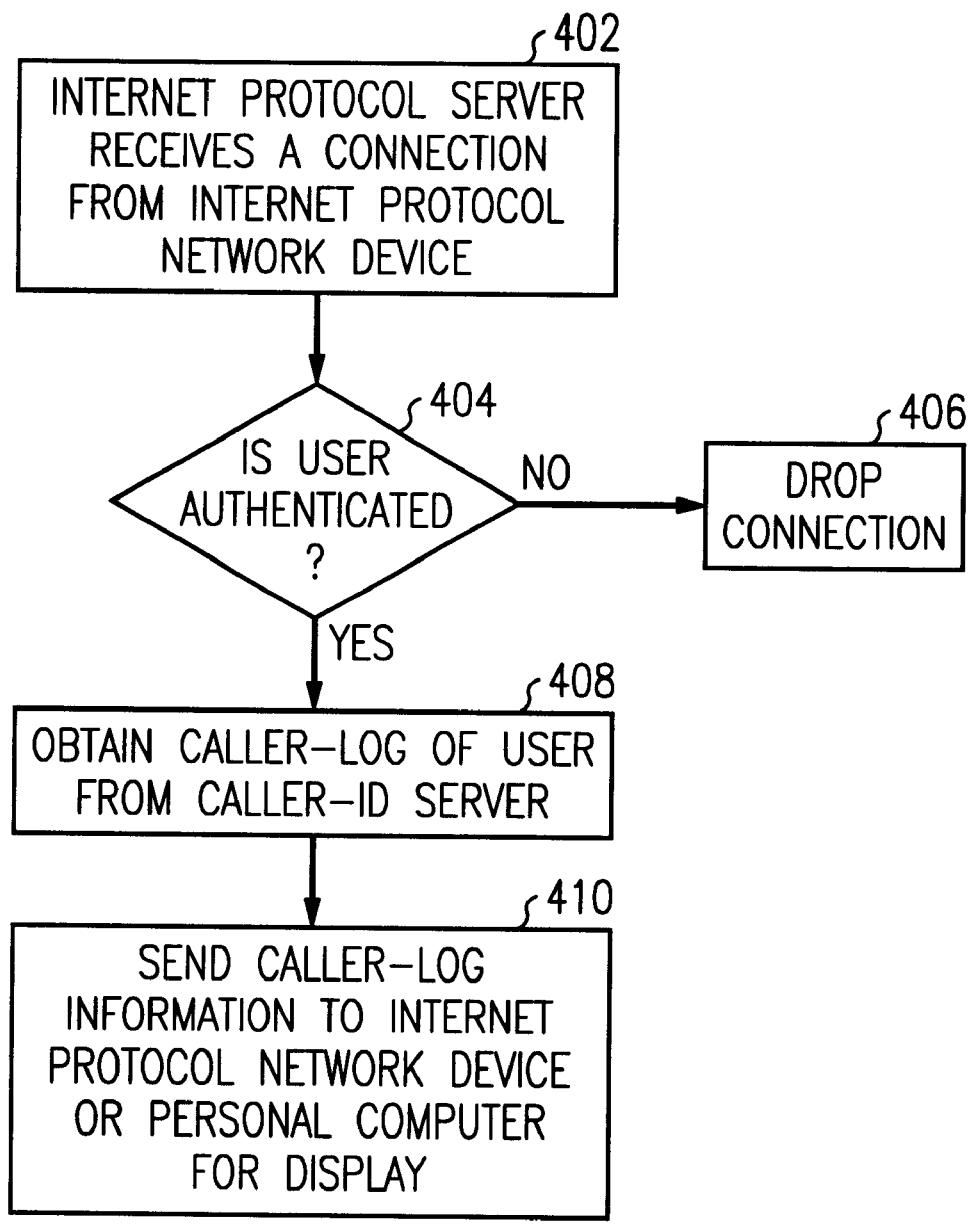

TELEPHONE CALLER IDENTIFICATION LOG WITH INTERNET ACCESS

TECHNICAL FIELD

The invention relates to a system for telecommunication intelligent network functions and more particularly to a system for storing and retrieving caller identification information from previous calls.

DESCRIPTION OF THE PRIOR ART

Some local exchange telecommunication switches presently can aurally inform an inquirer what the caller identification number of the last caller that had such information available. In many areas, this caller identification is accessed by the sequence "*69" or some similar sequence code. Private telephone caller identifications are not retrievable by this system because they are blocked. So in some cases, the number aurally transmitted is not of the last call, but of a prior call. The aural information does not include time of date information, so the result of a "*69" sequence is not always correct, which is a considerable drawback.

Some customer premises equipment (CPE) presently have storage capability for the caller identification of incoming calls, assuming that such caller identification is not blocked as it is in some cases. For example, Lucent Technologies produces a model ISDN 8520T CPE which keeps a log of unanswered incoming, answered incoming and outgoing telephone calls. Each recorded call has a time of day and date record also, so 'number unavailable' calls can be distinguished from caller ID available calls. This CPE when used with a switch with such information, such as an ISDN PBX switch, will give each caller's name if it is stored in the switch's database. All this caller ID information appears on a liquid crystal display (LCD). Earlier versions of similar ISDN telephones used video displays instead. Further, the model ISDN 8520T, like many other ISDN telephones, have a data port to which a computer may be connected. In such a connection, the caller ID information may be captured by the computer, displayed, time stamped and stored just as the CPE does.

Some CPE that are used with analog plain old telephone service (POTS) have similar capabilities to the ISDN CPE, even though the information is sent as an analog rather than a digital signal as in an ISDN system. The caller identification information on a POTS line is an analog type of signal with data encoded thereon which is transmitted between ringing pulses on a POTS system. The CPE must have a decoder to capture and decode the information back into a seven or ten digit number which is displayed on a display. Some CPE have this decoder and display integrated into the telephone station. Such CPE may also have a memory record of the last few caller identifications received. This record may also have a time of call/call-attempt, and also each caller's name if available from the local service provider.

Both the ISDN caller ID log and the POTS caller ID log suffer from the same problems, namely that the retrieval of caller ID log data can only be performed at the CPE station. Therefore, any sorting of caller IDs into higher priority groups, for example most users would put calls from family members, job related calls, and calls from friends in a higher priority group, and calls from sales people, calls from telemarketers and calls having caller ID blocked would be put in a lower priority, is only possible at the CPE station location (if at all).

SUMMARY OF THE INVENTION

Briefly stated, in accordance with one aspect of the invention the aforementioned problems are over come and a technical advance achieved by providing a method of retrieving caller identification information about an incoming call from a calling station to a called station. The method includes the steps of receiving the incoming call at a local switch to which a line of the called station is connected, determining from the incoming call caller ID information, storing the caller ID information in a memory of a caller ID unit that is connected to the local switch and also to an internet network, accessing the caller ID unit via the internet network; and retrieving the caller ID information from the caller ID unit via the internet network.

This caller ID information is subsequently displayed, usually, on a display of a browser or some other internet protocol communication device. These displays usually have interactive areas so click to dial to call an entry on the caller ID display can be effected.

BRIEF DESCRIPTION OF THE DRAWING

FIGS. 2A and 2B are simplified diagrams of a chronological display of retrieved caller identification information and a prioritized display of retrieved caller identification information, respectively.

FIG. 3 is a flow diagram for logging a call.

FIG. 4 is a flow diagram for retrieving a call log over an IP network.

DETAILED DESCRIPTION

Figure 1:
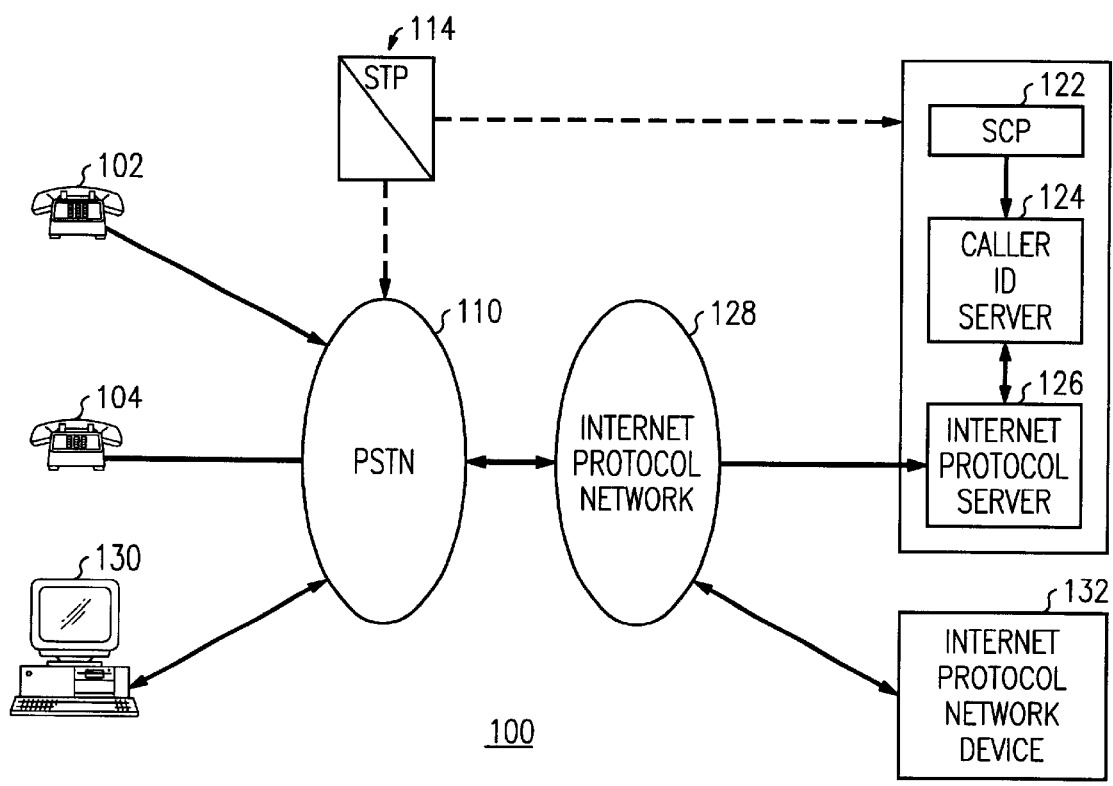
FIG. 1 is a simplified diagram of a system arrangement for practicing storing and retrieving caller identification information.

Referring now to FIG. 1, a system 100 is shown that is useful for practicing the method for storing and retrieving a caller identification according to the present invention. A caller at telephone station 102 initiates a call to called party at telephone station 104 by using public switched telephone network (PSTN) 110. Telephone station 102 maybe connected to PSTN 110 via a POTS service, an ISDN service, a wireless service or even a telephone over internet call service, as long as PSTN 110 can receive the initiated call. PSTN 110 may include a local telephone switch (not shown), such a 5ESS® by Lucent Technologies Inc. of Murray Hill, N.J. or comparable local telephone switch. PSTN 110 upon receiving the call initiated from telephone station 102 forwards information of the call to signaling transfer point (STP) 114 only if station 104 has been provisioned with a trigger for this service. STP 114 forwards this information to service control point (SCP) 122. SCP 122 is capable of providing standard Advanced Intelligent Network (AIN) services based on the called telephone station, i.e. telephone station 104, to send caller identification information to new caller identification server 124. The SCP 122 examines the information received from STP 114 to determine if the called telephone station 104 is a subscriber to the caller identification storage and retrieval service according to the present invention. If so, then SCP 122 forwards the caller identification to caller identification server 124.

Caller identification server 124 receives the caller identification information from SCP 122, time stamps the information to log-in this information and stores the caller information in an area of server 124 associated with called telephone station. Alternatively, the time logging could be performed by the SCP 122, but the SCP 122 often has many intelligent network tasks to provide, so caller ID server 124 would be the preferred location to perform the time stamping for such a case. SCP 122 may also have a name associated with the caller identification as is provided in some advanced intelligent networks, and if available, this name is also stored in caller ID server 124 as part of the caller identification information. If the called number is the number of a subscriber to this service, this available caller identification information is stored in caller ID server 124 for each caller attempting to reach the called telephone station number, whether completed or not. Assuming, of course, that only a reasonable number of caller ID records must be stored per subscriber, otherwise storage component expense and retrieval processing time become prohibitive.

Since a caller at station 102 has called telephone station 104 and called telephone station 104 is a station of the storage and retrieval service of the present invention, there is a record of this call in caller ID server 124. Connected to caller ID server 124 is an internet protocol server 126. Internet protocol server 126 is preferably a hyper text transfer protocol type of server, also known as a web server, although file transfer protocol type servers or telnet protocol type servers are also contemplated for this service. With the caller ID information for each subscriber stored in caller ID server 124, the next task is to provide retrieval in the easiest, most flexible and most advantageous ways. As shown in FIG. 1, a personal computer 130, or a similar type of workstation or video terminal station, is connected to the PSTN 110. This connection may be by POTS and FSK modem or by ISDN and ISDN modem in or attached to the personal computer 130, as examples. A user at personal computer 130 can initiate a data call through PSTN 110 to internet protocol network 128.

Internet protocol network 128 provides a gateway for data from PSTN 110 to internet services, such as internet protocol server 126. For the data call from personal computer 130, internet protocol network 128 converts the POTS-FSK modem signals to TCP/IP data signals, and then accesses internet protocol server 126 by internet protocol signaling.

At this point, internet protocol server 126 should require authentication of the accessing user by user identification and password protection. Assuming the user is authenticated, internet protocol server 126 accesses caller ID server 124 and reads the call record of calls for telephone station 104 using hypertext transfer protocol (http) or similar internet protocols. If a user is away from his or her telephone station but has a personal computer or similar device that can access the internet, the user can retrieve, from the service provided by the present invention, a displayed list of call time, caller telephone number (if not blocked at SCP 122) and caller name (if available from SCP 122). Further, this retrieved list can be prioritized, either at the servers 124 and 126 or at the personal computer 130. Prioritizing by one of the servers 124 or 126 means that a relatively simple browser or similar program may be used to access the prioritized information. Prioritizing at the personal computer 130 makes the tasks required of the servers 124, 126 less complex and less time consuming.

Referring now to FIG. 2, a representative display 200 of a retrieved caller information record is shown. This particular record is that of Mr. John Jones at number 630-YYY-XXXX. After he has accessed the internet protocol server 126, authenticated himself and had the server 126 retrieve his caller identification records from server 124, this type of information is presented. Mr. John Jones has prioritized his calls by caller, so his relative, Mrs. T. Jones, is listed first even though she called later than the caller first in time. The next caller is probably a telemarketer because there was no caller number available, no caller name available. This entry will typically be deleted from the record by the user. The next entry is Dr. Smith, who has not been placed in the priority list, so her call is put in chronological order at the end. Preferably, the personal computer 130 is provided with browser or similar software such that the fields of each record are interactive. A field may be included on each call record enabling the user to dial back a number in the retrieved list. Thus, if John Jones selects and activates the number in the record of the call by "Mrs. T. Jones" a call is initiated. The call back may be accomplished in either of two ways, depending on the type of equipment and the number of telephone communication lines the user has. If the user has internet telephony and only one communication line, the call is accomplished using the internet protocol link and personal computer 130 using internet telephony hardware and software, versions of which are presently known and available. If the user has two communication lines, the personal computer 130 on one line can dial the selected number using a telephone dialer application on the other telephone line to dial the selected number, which in the above example is Mrs. T. Jones.

Referring now to FIGS. 1 and 3, the method 300 for storing caller identification information of a caller at station 102 for a subscriber's station 104 for retrieval via an internet protocol service. Station 102 initiates a call which travels through the public switched telephone network 110 to signal transfer point (STP 114). At step 302, the call and related data is sent from STP 114 to service control point (SCP 122), which receives the call. Next, step 304 determines if the called party of this call is a subscriber to the telephone caller identification log with internet access service. If the called party is not a subscriber to the telephone caller identification log with internet access service, method 300 progresses to step 306, where SCP 122 sends the call back to STP 114 for normal processing and method 300 stops for this call. If the called party is a subscriber to the telephone caller identification log with internet access service, then the method 300 progresses to step 308. At step 308, the caller identification data is sent to caller ID server 124 and the method 300 progresses to step 310. At step 310, the caller ID server 124 time stamps the call data and logs this call's time stamp, caller's name (if available) and the caller's number (if available). If the subscriber to the telephone caller identification log with internet access service just wants a chronological log, the method 300 would end here, but if some other order of priorities besides chronological is desired and such prioritizing is available at server 124, then step 312 is the next step. At step 312, the call data entries are ordered according to groups important to the subscriber, such as calls from family members and close friends, calls that are work related, general calls and no data given calls—no data calls are presumed to be telemarketers. FIG. 2B shows a display 200B that has been re-ordered from chronological order to an order according to personal priorities. By building up individual records for individual subscribers, the caller ID server 124 maintains a lot of call data for a lot of subscribers to the telephone caller identification log with internet access service.

Method 300 was only half of the task, the other half is method 400 which is described hereinafter with reference to FIGS. 1 and 4. In method 400, first step 402 is when a subscriber to the telephone caller identification log with internet access service at either personal computer 130 or internet device 132 accesses internet protocol server 126. Personal computer 130 accesses internet protocol server 126 via a modem via PSTN 110 through a gateway to internet protocol network 128. Internet protocol network device 132 accesses internet protocol network 128 essentially directly, such as many industry and library device set-ups, in order to access internet protocol server 126. Next, step 404 determines if the user attempting an access can meet authentication requirements, e.g. user name and password, to be granted accesses to a user's records stored on internet protocol server 126. If the user cannot meet authentication requirements, the access attempt is terminated at step 406 and method 400 is over for this access attempt. If the user meets authentication requirements, method 400 progresses to step 408. At step 408, the internet protocol server 126 requests and obtains the user's caller identification log from caller ID server 124, the positive authentication is taken by method 300 and server 126 as a user request to retrieve the user's call identification log. Next, at step 410, internet protocol server 126 receives the requested caller identification log record and forwards this data to internet protocol device 132 or personal computer 130 for showing upon their respective displays. The displays are expected to be similar in appearance and operation to the example shown in FIG. 2 and the description present above in regard to FIG. 2.

Another embodiment of the invention has the caller ID server 124 periodically gather all calls logged in the latest period of time into one or more e-mail messages and send the e-mail to the subscriber. After some period then the caller ID server 124 can erase or drop previously e-mailed call logs in order to manage storage space on the caller ID server 124. The e-mail may be archived and/or encrypted to the extent that the caller ID service provider and/or the caller ID subscriber agree on such actions.

Another embodiment of the invention has the caller ID server 124 subsequently send an e-mail message to the subscriber in regard to each call logged very soon after the logging in caller ID server 124 is completed. As in the other e-mail embodiment, after some period then the caller ID server 124 can erase or drop previously e-mailed call logs in order to manage storage space on the caller ID server 124 and the e-mail may be archived and/or encrypted to the extent that the caller ID service provider and/or the caller ID subscriber agree on such actions.

Thus, it will now be understood that there has been disclosed a new method and apparatus for storing and retrieving caller identification information using an internet retrieval device. While the invention has been particularly illustrated and described with reference to preferred embodiments thereof, it will be understood by those skilled in the art that various changes in form, details, and applications may be made therein. For example, caller ID server 124 and internet protocol server 126 could be unified into a single caller ID and internet protocol server. Additionally, service control point 122 could be unified with server 124 and/or server 126. Such combinations would simplify data accesses between SCP and servers. It is accordingly intended that the appended claims shall cover all such changes in form, details and applications that do not depart from the true spirit and scope of the invention.

What is claimed is:

1. A method of retrieving caller identification information about an incoming call from a calling station to a called station, comprising the steps of:
   receiving said incoming call at a local switch to which a line of the called station is connected;
   determining caller ID information from said incoming call;
   storing said caller ID information in a memory of a caller ID unit that is connected to said local switch and also connected to an Internet network;
   accessing said caller ID unit via said Internet network; and
   retrieving said caller ID information from said caller ID unit via said Internet network.

2. The method of claim 1, wherein said accessing is accomplished by using hypertext transfer protocol.

3. The method of claim 2, wherein said accessing using hyper-text transfer protocol is accomplished by using a world wide web browser.

4. The method of claim 3, wherein said retrieved caller ID information is retrieved and displayed by the world wide web browser.

5. The method of claim 4, further comprising the steps of:
   selecting a number to dial from said retrieved caller ID information and
   activating an interactive region of said world wide web browser to initiate a dialing of said selected number.

6. The method of claim 5, wherein said dialing is via Internet telephony.

7. The method of claim 5, wherein said dialing is by an auto dialing program of said web browser.

8. The method of claim 1, wherein said further comprising the step of:
   e-mailing said caller ID information to an e-mail address of a called party.

9. The method of claim 8, wherein said e-mailing step is done periodically.

10. The method of claim 8, wherein said e-mail step is done subsequent to each incoming call.

11. The method of claim 1, wherein said caller ID information is stored for retrieval even if the incoming call is not completed to the called station.

12. The method of claim 10, wherein a time stamp is included as part of each caller ID information.

13. The method of claim 1, wherein said accessing is accomplished by using an Internet protocol.

14. The method of claim 12, wherein said accessing using an Internet protocol is accomplished by using an Internet protocol network access and display device.

15. A method of retrieving caller identification information about a plurality of incoming calls from a plurality of calling stations to a called station, comprising the steps of:
   receiving said incoming calls at a local switch to which a line of the called station is connected;
   determining caller ID information for each of said plurality of incoming calls;
   storing said caller ID information for each of said plurality of incoming calls in a memory of a caller ID unit that is connected to said local switch and also to an Internet network;
   accessing said caller ID unit via said Internet network; and
   retrieving said caller ID information for each of said plurality of incoming calls from said caller ID unit via said Internet network.

16. A method of using caller identification information about an incoming call from a calling station to a called station, comprising the steps of:
   receiving said incoming call at a local switch to which a line of the called station is connected;
   determining caller ID information from said incoming call;
   storing said caller ID information in a memory of a caller ID unit that is connected to said local switch and also to an Internet network;

accessing said caller ID unit via said Internet network;

retrieving said caller ID information from said caller ID unit via said Internet network by a world wide web browser, and displaying said caller ID information by said world wide web browser.

17. The method of claim 16, further comprising the steps of:

clicking on said displayed caller ID to dial a call to the displayed number.

18. The method of claim 17, wherein said clicking to dial is accomplished using Internet telephony.

19. A method of retrieving caller identification information about an incoming call from a calling station to a called station, comprising the steps of:

receiving said incoming call at a local switch to which a line of the called station is connected;

determining caller ID information from said incoming call;

storing said caller ID information in a memory of a caller ID unit that is connected to said local switch and also connected to an Internet network;

receiving a request via said Internet to access said caller ID unit to retrieve caller ID information; and responding to said request by providing said requested caller ID information from said caller ID unit via said Internet network.

20. The method of claim 19, wherein said responding is accomplished by using hypertext transfer protocol.

21. The method of claim 20, wherein said responding using hyper-text transfer protocol is accomplished by using a world wide web browser.

22. The method of claim 21, wherein said provided caller ID information is received and displayed by the world wide web browser.

23. The method of claim 22, further comprising the steps of:

selecting a number to dial from said provided caller ID information and activating an interactive region of said world wide web browser to initiate a dialing of said selected number.

24. The method of claim 23, wherein said dialing is via Internet telephony.

25. The method of claim 23, wherein said dialing is by an auto dialing program of said web browser.

26. The method of claim 19, wherein said further comprising the step of:

e-mailing said caller ID information to an e-mail address of a called party.

27. The method of claim 26, wherein said e-mailing step is done periodically.

28. The method of claim 26, wherein said e-mail step is done subsequent to each incoming call.

29. The method of claim 19, wherein said caller ID information is stored for retrieval even if the incoming call is not completed to the called station.

30. The method of claim 29, wherein a time stamp is included as part of each caller ID information.

31. The method of claim 19, wherein said requesting is accomplished by using an Internet protocol.

* * * * *